(No Model.)
W. KOCH.
MECHANICAL MOVEMENT.
No. 315,639. Patented Apr. 14, 1885.
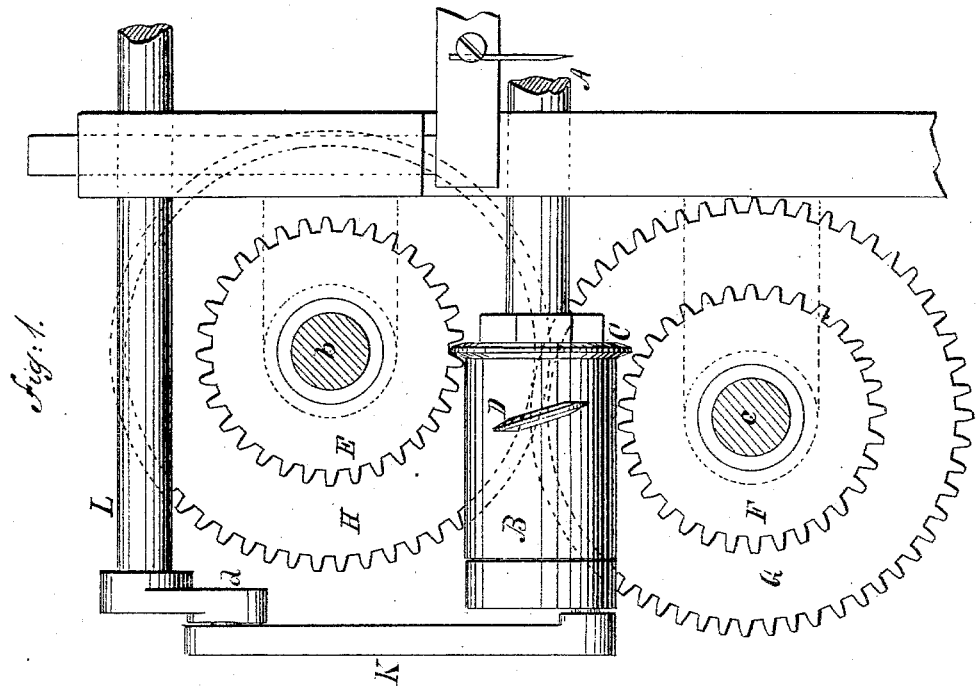
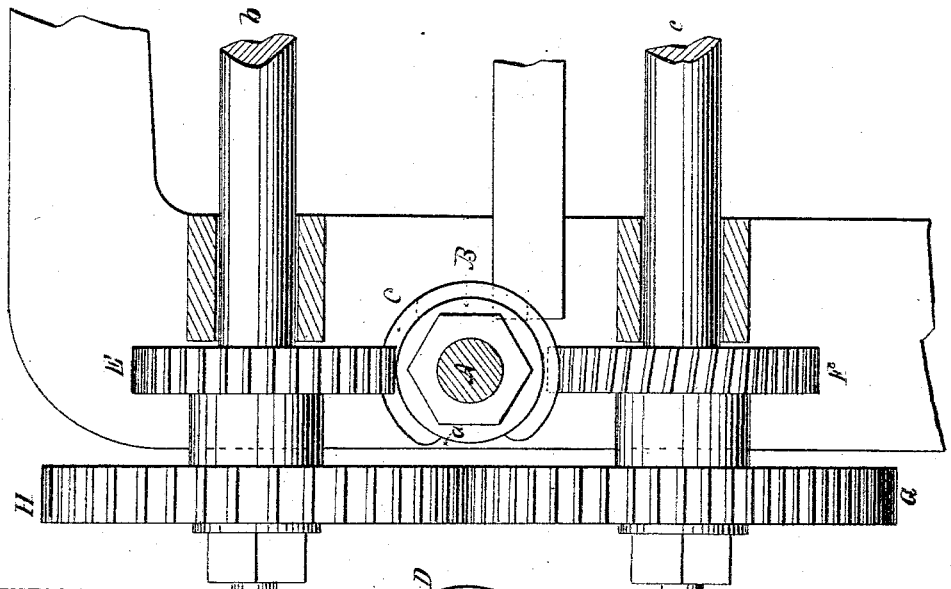
WITNESSES:
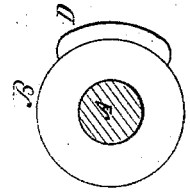
INVENTOR
William Koch
BY
ATTORNEY

UNITED STATES PATENT OFFICE.

WILLIAM KOCH, OF NEW YORK, N. Y.

MECHANICAL MOVEMENT.

SPECIFICATION forming part of Letters Patent No. 315,639, dated April 14, 1885.

Application filed July 7, 1884. (No model.)

*To all whom it may concern:*

Be it known that I, WILLIAM KOCH, of the city, county, and State of New York, have invented a new and useful Improvement in Mechanical Movements; and I declare the following to be a full, clear, and exact description of the same, reference being had to the accompanying sheet of drawings, forming part of this specification.

This invention relates to an improvement in mechanical movements, and is more especially designed for use in quilting-machines; and the invention consists of the mechanism hereinafter shown, described, and claimed for producing a positive intermitting reciprocating motion to the traveling carriage of a quilting-machine, or to any other thing where such a motion is desirable.

In the accompanying sheet of drawings, Figure 1 is a side elevation. Fig. 2 is an edge view. Fig. 3 is a cross-section of drum, showing sectional worm.

Similar letters of reference indicate like parts in the several figures.

The particular use of this invention will be understood by an examination of my patent of the United States for quilting-machine, granted the 30th day of January, 1883, No. 271,475. In such machines it is essential there shall be mechanism which will impart to the sliding carriage a positive intermitting motion—that is, mechanism that will enable the carriage to reciprocate freely on the bed of the machine, but at given intervals to stop positively and promptly in its traveling.

Mechanism has heretofore been employed for the purpose of producing an intermitting motion in the sliding carriage of quilting-machines; but such intermission has not been prompt or positive enough to produce satisfactory results, so far as the regularity of the pattern that is stitched is concerned. To effect this desired result, I construct a quilting-machine with a driving-shaft, A, which may be operated by any desired power. Onto this driving-shaft is fixed a drum, B, with a beveled flange, C, encircling about five-sixths, or thereabout, the diameter of the drum B, the remaining sixth, a, forming a gap. Onto this drum B is fixed, at a suitable angle, a section of a worm, D. Supported in suitable bearings on the frame of the machine, and on either side of the drum B, are two gear-wheels, E and F, and on the shafts $b$ and $c$ of these gear-wheels are also fixed gear-wheels G and H. The gears of these last-mentioned wheels mesh into each other, as shown in Fig. 2, and the gears of the wheel E engage with the flange C, and the gears of the wheel F engage with the sectional worm D.

Suitably journaled to the drum B is a link or connecting-bar, K, the other end of this bar being connected by a wrist-pin to a crank, $d$, which crank is in turn fastened to a shaft, L.

To the shaft $c$ of the gear-wheel F, by any suitable mechanism, not necessary to describe, since it forms no part of this present invention, is connected the sliding or reciprocating carriage of the quilting-machine.

Now, when a quilting-machine is provided with the mechanism hereinbefore described, the operation of its sliding carriage (which carriage, I may observe, is the same in construction as are such carriages ordinarily) is as follows: Power being applied to the driving-shaft A, the drum B is caused to revolve, and as it revolves the sectional worm D, working into the gears of the wheel F, causes that wheel and its shaft $c$ to revolve likewise, and thereby cause the revolving of the gear-wheel G, and the revolving of the shaft $c$ through the intermediate mechanism (not described) imparts to the ordinary sliding carriage a reciprocating motion, and as the wheel G revolves it causes the revolving of the wheel H, by reason of their gears interlocking, and as the drum B continues to revolve the beveled flange C enters into or between the teeth of the wheel E, and when this flange is between the teeth of this wheel E, and the worm D being disengaged at that time, as is obvious, the wheel E cannot revolve, nor can its shaft $b$ revolve, nor the wheel H, fixed thereon, this wheel H being therefore stationary and meshing into the wheel G. This last-named wheel is also kept from revolving and its shaft $c$ from operating the sliding carriage, which by this means is kept for an interval stationary, until by the revolution of the drum B the gap $a$ in the flange C is brought opposite the teeth of the wheel E, when that wheel, its shaft, and the wheels H, F, and G and the shaft $c$ are again caused to revolve by the operation of the worm, nothing being opposed to them, and as they revolve the sliding carriage is permitted to travel until its motion is again arrested by the interlocking of the flange C with the wheel E, as before described.

From the foregoing it will be seen that an intermitting motion is given to the shaft $c$, and necessarily to whatever may be connected to that shaft, the connection in this instance being the traveling carriage of a quilting-machine, and not only is this traveling of the carriage intermitting, but this intermitting motion, or the times of the traveling and ceasing to travel of this carriage, are arrived at in a most positive manner, for the entering of the beveled flange C between the gears of the wheel E so effectually dogs that wheel that it is compelled to stop instantly, its momentum being arrested, and when the gap $a$ presents itself to the gears of that wheel it as promptly begins to revolve. This instantaneous stopping or arresting the momentum of the traveling carriage is a matter of great importance, since by such prompt action only can exact designs with sharp angles be stitched on the fabric being operated upon.

In all other classes of quilting-machines provision has been made for stopping the mechanism that operated the sliding carriage; but, the momentum not being arrested, the carriage would still travel to an appreciable extent, and the result would show in the unsatisfactory character of the stitching produced.

Having now described my invention, what I claim as new, and desire to secure by Letters Patent, is—

1. A mechanism for giving a reciprocating motion to a sliding carriage or other object, consisting of a revolving drum on which is fixed a section of a worm, and a flange with a gap therein, and gear-wheels E and F and G and H, and shafts $b$ and $c$, arranged substantially as described.

2. In a mechanism for producing reciprocating motion, a revoluble shaft provided with a flange, C, and a section of a worm, to operate as described, and for the purpose set forth.

3. In mechanism for giving a reciprocating motion, the combination of geared wheels E and F, G and H, a revolving flange, and a sectional worm, substantially as described.

WILLIAM KOCH.

In presence of—
M. F. FINNEGAN,
D. A. CARPENTER.